United States Patent
Lai et al.

(10) Patent No.: US 11,750,247 B2
(45) Date of Patent: Sep. 5, 2023

(54) INDUCTOR CIRCUIT AND WIRELESS COMMUNICATION DEVICE HAVING INDUCTOR CIRCUIT INTEGRATED ON SINGLE CHIP DIE TO SAVE MORE CIRCUIT COSTS

(71) Applicant: PixArt Imaging Inc., Hsin-Chu (TW)

(72) Inventors: Mu-Tsung Lai, Hsin-Chu (TW); Tung-Ying Chiang, Hsin-Chu (TW); Chien-An Hou, Hsin-Chu (TW); Chia-Pei Chen, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 32 days.

(21) Appl. No.: 17/584,392

(22) Filed: Jan. 26, 2022

(65) Prior Publication Data

US 2023/0239008 A1 Jul. 27, 2023

(51) Int. Cl.
*H01F 27/28* (2006.01)
*H01F 27/29* (2006.01)
*H01F 5/00* (2006.01)
*H04B 1/44* (2006.01)
*H04B 5/00* (2006.01)

(52) U.S. Cl.
CPC .................................. *H04B 5/0075* (2013.01)

(58) Field of Classification Search
None
See application file for complete search history.

(56) References Cited

U.S. PATENT DOCUMENTS

| | | | | |
|---|---|---|---|---|
| 6,476,704 B2 * | 11/2002 | Goff | ............... | H01F 17/0006 336/200 |
| 6,603,383 B2 * | 8/2003 | Gevorgian | .......... | H01F 17/0013 336/200 |
| 6,707,367 B2 * | 3/2004 | Castaneda | ............... | H01F 21/12 336/200 |
| 6,801,114 B2 * | 10/2004 | Yang | ...................... | H03H 7/42 336/200 |
| 6,882,263 B2 * | 4/2005 | Yang | ..................... | H01L 23/645 336/200 |
| 7,088,214 B2 * | 8/2006 | Castaneda | .......... | H01F 17/0006 336/200 |
| 7,171,739 B2 * | 2/2007 | Yang | .................. | H01F 17/0013 336/200 |
| 7,526,256 B2 * | 4/2009 | Bhatti | ..................... | H04B 1/006 455/73 |
| 7,750,787 B2 * | 7/2010 | Yoon | ........................ | H01F 19/04 336/223 |
| 7,751,790 B2 * | 7/2010 | Rofougaran | ........... | H01L 23/48 455/292 |

(Continued)

*Primary Examiner* — Tuan A Tran
(74) *Attorney, Agent, or Firm* — Winston Hsu (57) ABSTRACT

An inductor circuit includes a receiver inductive circuit, a transmitter inductive circuit, and an antenna inductive circuit which are implemented on a single chip die; the receiver inductive circuit is disposed on a specific ring of a specific plane to form a ring shape; the transmitter inductive circuit and the antenna inductive circuit are disposed inside the specific ring and surrounded by the specific ring of the specific plane; and, a circuit area, occupied by the transmitter inductive circuit, inside the specific ring and on the specific plane, is larger than a circuit area occupied by the receiver inductive circuit and by the antenna inductive circuit.

14 Claims, 5 Drawing Sheets

(56) References Cited

U.S. PATENT DOCUMENTS

| | | | | |
|---|---|---|---|---|
| 7,808,356 B2* | 10/2010 | Papananos | ............... | H03H 7/42 |
| | | | | 336/200 |
| 7,973,636 B2* | 7/2011 | Yoon | ........................ | H03H 7/42 |
| | | | | 336/200 |
| 8,064,864 B2* | 11/2011 | Rofougaran | ............. | H04B 5/02 |
| | | | | 455/292 |
| 8,183,970 B2* | 5/2012 | Papananos | ............... | H03H 7/42 |
| | | | | 336/200 |
| 8,198,714 B2* | 6/2012 | Rofougaran | ......... | H04B 5/0093 |
| | | | | 257/E23.036 |
| 8,270,912 B2* | 9/2012 | Rofougaran | ........... | H01Q 23/00 |
| | | | | 455/107 |
| 8,505,193 B2* | 8/2013 | Papananos | .......... | H01F 27/2804 |
| | | | | 336/200 |
| 8,552,812 B2* | 10/2013 | Yen | ..................... | H01L 23/5223 |
| | | | | 336/200 |
| 8,855,581 B2* | 10/2014 | Rofougaran | ...... | H01L 23/49822 |
| | | | | 455/107 |
| 8,912,639 B2* | 12/2014 | Rofougaran | ........ | H01F 17/0013 |
| | | | | 361/836 |
| 9,379,785 B2* | 6/2016 | Shameli | ................... | H04B 5/02 |
| 9,509,273 B2* | 11/2016 | Andersson | ........... | H03H 7/1758 |
| 9,543,073 B2* | 1/2017 | Xie | ........................ | H01F 41/06 |
| 9,853,621 B2* | 12/2017 | Andersson | ........... | H03H 7/1758 |
| 10,615,777 B2* | 4/2020 | Visser | ..................... | H03H 7/42 |
| 10,749,564 B2* | 8/2020 | Khatib | ..................... | H03F 3/245 |
| 2013/0265132 A1* | 10/2013 | Huang | ................... | H01F 27/29 |
| | | | | 336/200 |
| 2013/0267185 A1* | 10/2013 | Chen | ........................ | H04B 1/44 |
| | | | | 455/78 |
| 2020/0028536 A1* | 1/2020 | Liu | ........................ | H04B 1/48 |

\* cited by examiner

INDUCTOR CIRCUIT AND WIRELESS COMMUNICATION DEVICE HAVING INDUCTOR CIRCUIT INTEGRATED ON SINGLE CHIP DIE TO SAVE MORE CIRCUIT COSTS

BACKGROUND OF THE INVENTION

1. Field of the Invention

The invention relates to a transformer structure, and more particularly to an inductor circuit and a wireless communication device.

2. Description of the Prior Art

Generally speaking, for a conventional wireless transceiver, it is needed to use multiple circuit areas such as different chip dies to individually implement the different coils of a conventional transformer circuit of the conventional wireless transceiver. This indicates that more circuit areas are necessary for an implementation of the conventional transformer circuit.

SUMMARY OF THE INVENTION

Therefore one of the objectives of the invention is to provide an inductor circuit and a wireless communication device having the inductor circuit, to solve the above-mentioned problems.

According to embodiments of the invention, an inductor circuit is disclosed. The inductor circuit comprises a receiver inductive circuit, a transmitter inductive circuit, and an antenna inductive circuit. The receiver inductive circuit has a first end coupled to a first input port of a receiver circuit and a second end coupled to a second input port of the receiver circuit. The transmitter inductive circuit has a first end coupled to a first output port of a transmitter circuit and a second end coupled to a second output port of the transmitter circuit. The antenna inductive circuit has a first end coupled to a first signal port of an antenna circuit and a second end coupled to a second signal port of the antenna circuit. The receiver inductive circuit is disposed on a specific ring of a specific plane to form a ring shape; the transmitter inductive circuit and the antenna inductive circuit are disposed inside the specific ring and surrounded by the specific ring of the specific plane; and, a circuit area, occupied by the transmitter inductive circuit, inside the specific ring and on the specific plane, is larger than a circuit area occupied by the receiver inductive circuit and by the antenna inductive circuit.

According to the embodiments, a wireless communication device is further disclosed. The wireless communication device comprises the above-mentioned inductor circuit, an antenna circuit, a receiver circuit, and a transmitter circuit.

According to the embodiments, the better circuit balancing and better circuit/signal matching can be provided, and more circuit areas can be saved.

These and other objectives of the present invention will no doubt become obvious to those of ordinary skill in the art after reading the following detailed description of the preferred embodiment that is illustrated in the various figures and drawings.

DETAILED DESCRIPTION

The invention aims at providing a technical solution of a wireless communication device and a corresponding transformer inductor circuit in which its larger portion or all inductive components are disposed on and/or inside a ring of a specific plane, so as to effectively save circuit costs and reduce the circuit areas occupied by the inductive components. The provided technical solution can more effectively reduce the circuit area occupied by the inductive components for a single chip die. Compared to a conventional method which individually implements the different inductive components, the provided technical solution can efficiently integrate a larger portion or all inductive components into the same circuit area on the same plane to save more circuit costs.

Figure 1:
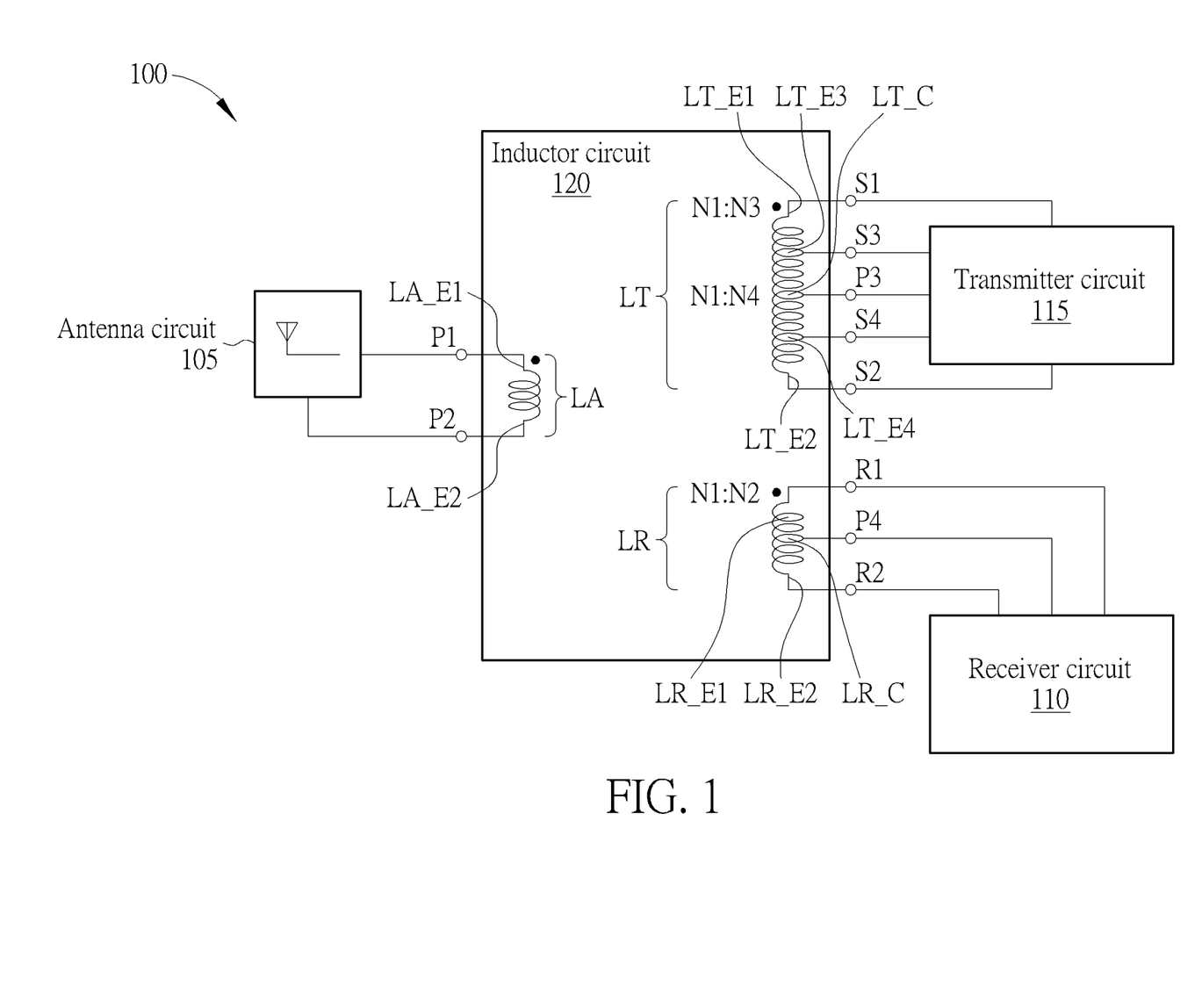
FIG. 1 is a block diagram of a wireless communication device according to an embodiment of the invention.

FIG. 1 is a block diagram of a wireless communication device 100 according to an embodiment of the invention. The wireless communication device 100 comprises an antenna circuit 105, a receiver circuit 110, a transmitter circuit 115, and an inductor circuit 120 which is a transformer circuit. The wireless communication device 100 for example is implemented by a system-on-chip (SOC) circuit component such as a single chip die. The wireless communication device 100 for example supports at least one kind of wireless communication protocols such as mobile communication protocol(s), Bluetooth communication protocol, and any versions of IEEE 802.11 communication protocols (i.e. Wireless LAN protocol). For instance, the wireless communication device 100 may be a Bluetooth transceiver or a Wi-Fi transceiver. The wireless communication device 100 for example is a transceiver device which can be operative in a signal reception mode and a signal transmission mode respectively.

The transmitter circuit 115 for example in the signal transmission mode is arranged to generate and output a set or pair of differential signals to the inductor circuit 120. The receiver circuit 110 in the signal reception mode is arranged to receive another set or pair of differential signals.

The inductor circuit 120 used as a transformer comprises a first inductive circuit LR, a second inductive circuit LT, and a third inductive circuit LA, wherein the inductive circuits LR, LT, and LA are respectively arranged and disposed for the receiver side, the transmitter side, and the antenna side, and are respectively called the receiver inductive circuit LR, transmitter inductive circuit LT, and the antenna inductive circuit LA in the following paragraphs. The antenna inductive circuit LA is disposed or located at a primary side of the transformer 120, and the receiver inductive circuit LR and transmitter inductive circuit LT are disposed or located at a secondary side of the transformer 120. The signal polarities are shown in FIG. 1.

The antenna inductive circuit LA is an inductive wire coil at the antenna side which has a first end LA_E1 coupled to a first signal port P1 of the antenna circuit 105 and has a second end LA_E2 coupled to a second signal port P2 of the antenna circuit 105. The first signal port P1 and second signal port P2 for example are differential signal ports used for transferring a pair of differential signals from the antenna circuit 105 to the transformer 120 in the signal reception mode and used for transferring another pair of differential signals from the transformer 120 to the antenna circuit 105 in the signal transmission mode. In the signal reception mode, the pair of differential signals are passed through the antenna inductive circuit LA and receiver inductive circuit LR through a transformer coupling operation and then received by the receiver circuit 110. In the signal transmission mode, the different pair of differential signals are passed through the transmitter inductive circuit LT and antenna inductive circuit LA through another transformer coupling operation and then received by the antenna circuit 105 to transmit the differential signals into the air.

Alternatively, in other embodiment, one of the first signal port P and second signal port P2 may be associated with an operation for transmitting and receiving a communication signal and the other port is associated with a ground level of the antenna circuit 105. This is not intended to be a limitation.

The receiver inductive circuit LR is an inductive wire coil at the reception side which has a first end LR_E1 coupled to a first input port R1 of the receiver circuit 110 and a second end LR_E2 coupled to a second input port R2 of the receiver circuit 110. The first input port R1 and second input port R2 are differential input ports of the receiver circuit 110. In addition, a center terminal/end LR_C of the wire coil of the receiver inductive circuit LR is coupled to the ground node P4 of the receiver circuit 110.

The transmitter inductive circuit LT is an inductive wire coil at the transmission side which has a first end LT_E1 coupled to a first output port S1 of the transmitter circuit 115 and a second end LT_E2 coupled to a second output port S2 of the transmitter circuit 115. The first output port S1 and second output port S2 are differential output ports of the transmitter circuit 115. In addition, the transmitter inductive circuit LT further comprises a first intermediate terminal LT_E3 coupled to a third output port S3 of the transmitter circuit 115 and a second intermediate terminal LT_E4 coupled to a fourth output port S4 of the transmitter circuit 115. The first output port S1 and the second output port S2 of the transmitter circuit 115 correspond to a first transmission power of the signal transmission mode, and the third output port S3 and the fourth output port S4 of the transmitter circuit 115 correspond to the signal transmission mode's a second transmission power which is different from the first transmission power. In addition, a center terminal/end LT_C of the wire coil of the transmitter inductive circuit LT is coupled to the ground node P3 of the transmitter circuit 115.

The turns ratios (or the numbers of turns) are respectively shown on FIG. 1. The number of turns for the antenna inductive circuit LA is N1, the number of turns for the receiver inductive circuit LR is N2, and the number of turns for the transmitter inductive circuit LT at different points is equal to N3 or N4. For instance, the receiver inductive circuit's LR wire coil from the first end LR_E1 to the second end LR_E2 is configured to have the number of turns equal to N2, and the antenna inductive circuit's LA wire coil from the first end LA_E1 to the second end LA_E2 is configured to have the number of turns equal to N1. The transmitter inductive circuit's LT wire coil from the first end LT_E1 to the second end LT_E2 is configured to have the number of turns equal to N3, and the transmitter inductive circuit's LT wire coil from the first intermediate terminal LT_E3 to the second intermediate terminal LT_E4 is configured to have the number of turns equal to N4. In an example (but not limited), the values of N1, N2, N3, and N4 are equal to 2, 1, 6, and 4. Further, the values of turns ratios of N1, N2, N3, and N4 may be identical or may be equal to different values in other embodiments. These examples are not intended to be the limitations of the invention.

Figure 2:
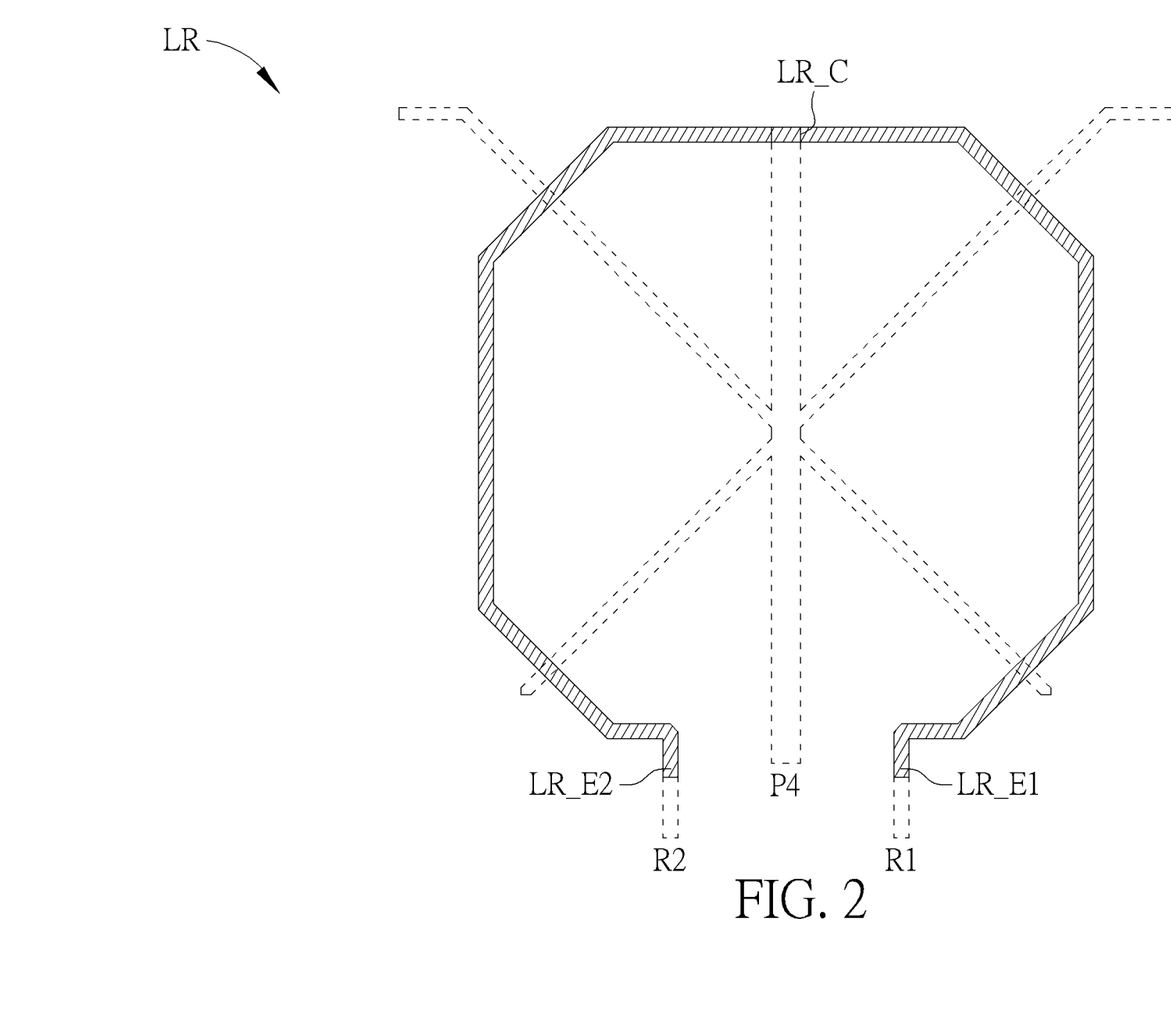
FIG. 2 is a diagram of a physical circuit layout example showing the receiver inductive circuit LR according to an embodiment of the invention.
Figure 3:
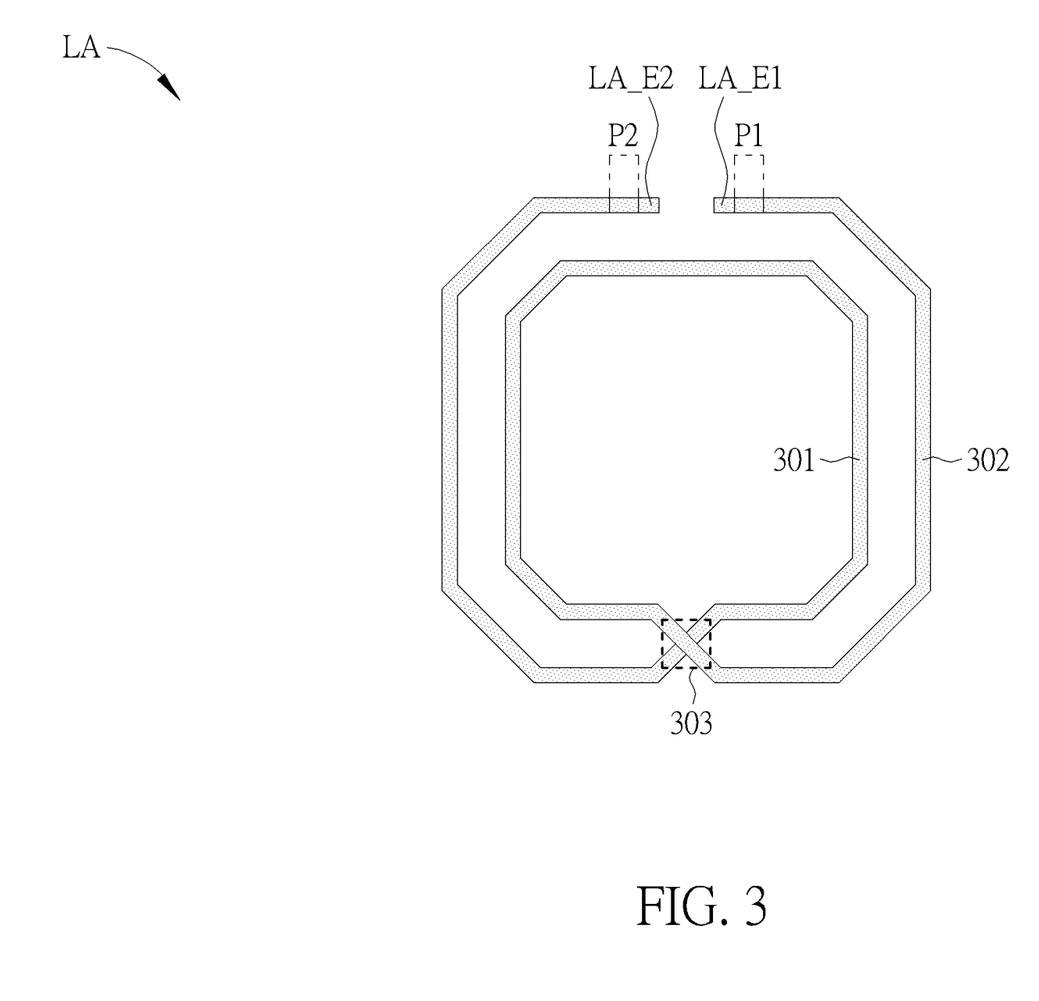
FIG. 3 is a diagram of a physical circuit layout example showing the antenna inductive circuit LA according to an embodiment of the invention.
Figure 4:
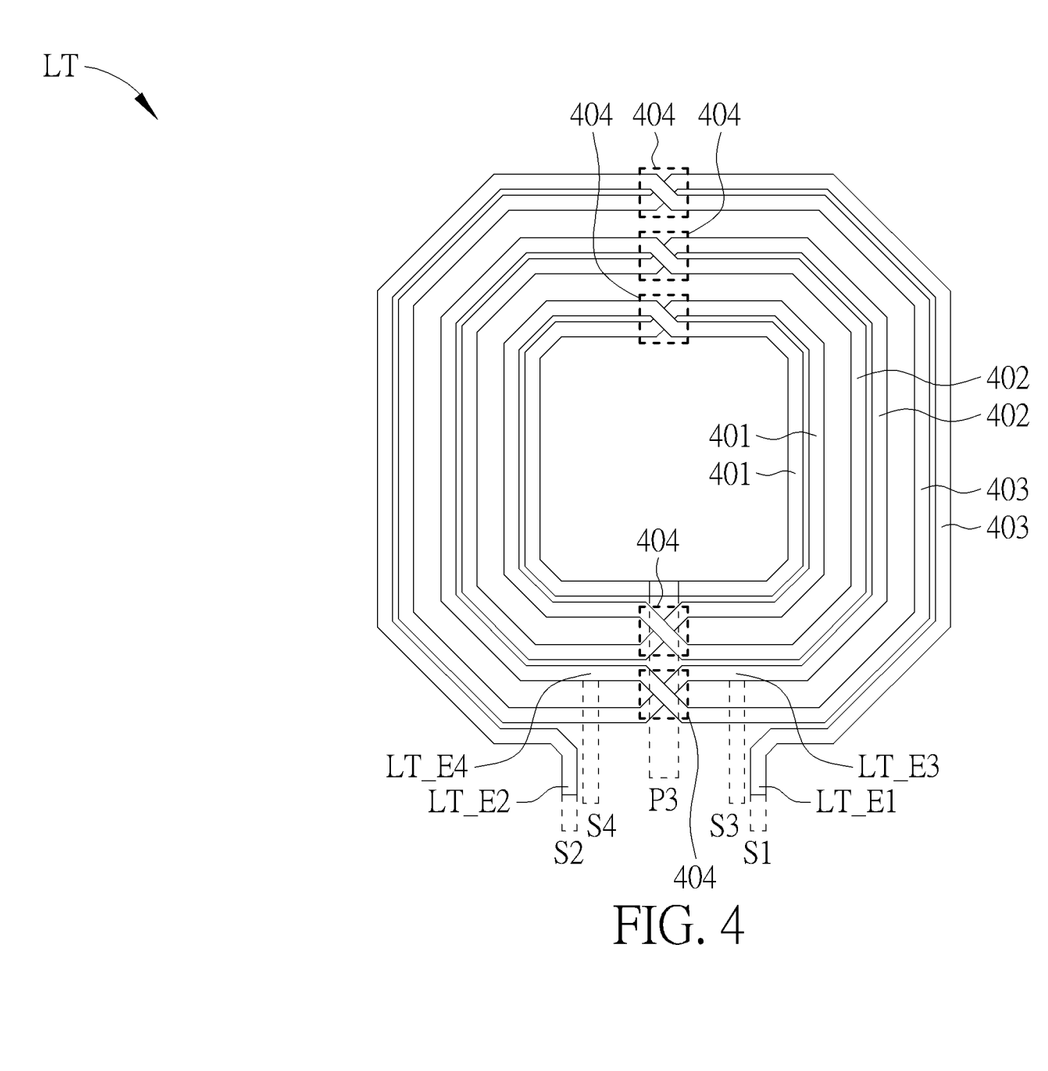
FIG. 4 is a diagram of a physical circuit layout example showing the transmitter inductive circuit LT according to an embodiment of the invention.
Figure 5:
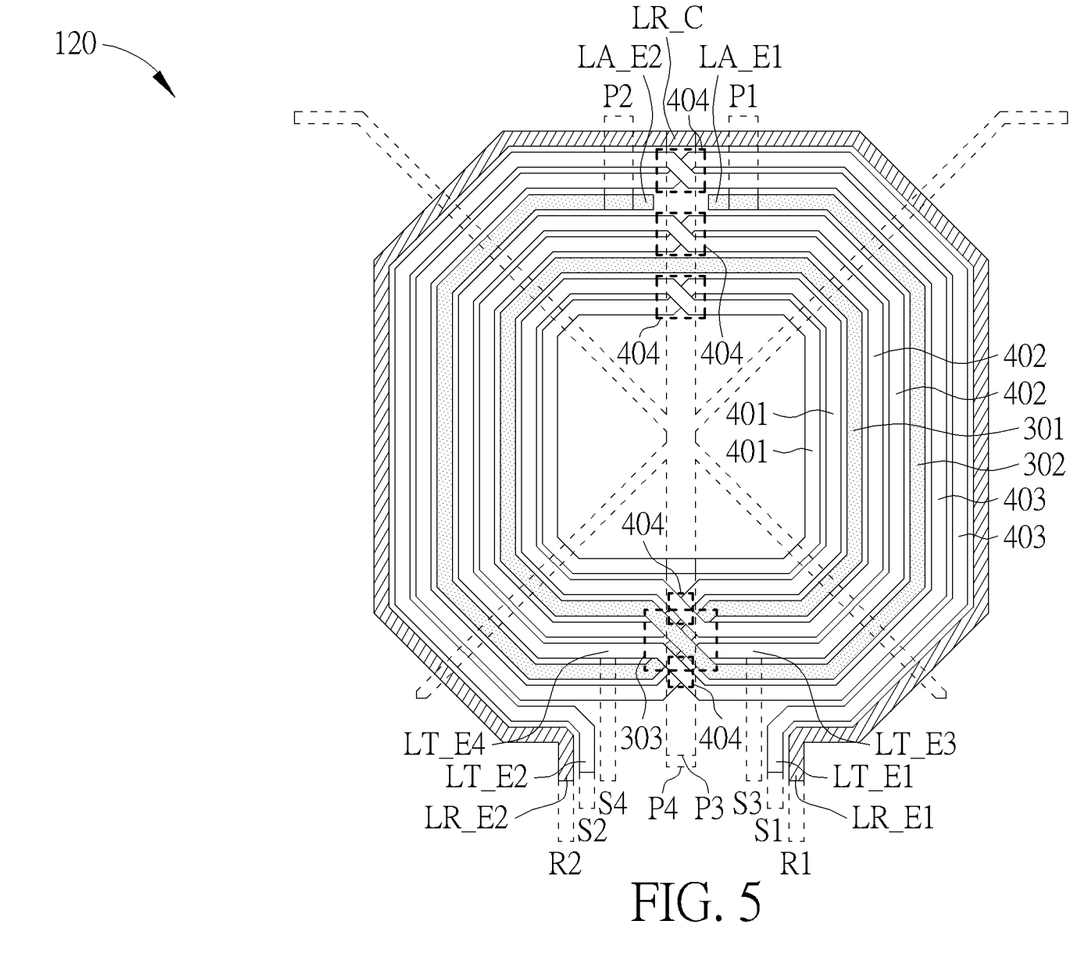
FIG. 5 is a diagram of a physical circuit layout example showing a combination displacement of the antenna, receiver, and transmitter inductive circuits LA, LR, and LT of the inductor circuit in FIG. 1 according to an embodiment of the invention.

To save more chip die areas as well as achieve the above-mentioned designs of inductive circuits, the above-mentioned inductive circuits LA, LR, and LT can be arranged to be positioned on a single circuit chip die to form the inductor circuit 120. Refer to FIGS. 2-4 in conjunction with FIG. 5. FIG. 2 is a diagram of a physical circuit layout example showing the receiver inductive circuit LR according to an embodiment of the invention. FIG. 3 is a diagram of a physical circuit layout example showing the antenna inductive circuit LA according to an embodiment of the invention. FIG. 4 is a diagram of a physical circuit layout example showing the transmitter inductive circuit LT according to an embodiment of the invention. FIG. 5 is a diagram of a physical circuit layout example showing a combination displacement of the antenna, receiver, and transmitter inductive circuits LA, LR, and LT of the inductor circuit 120 in FIG. 1 according to an embodiment of the invention. The combination displacement of the antenna, receiver, and transmitter inductive circuits LA, LR, and LT of the inductor circuit 120 are disposed on the same plane such as a specific plane.

In FIG. 2, in practice, the receiver inductive circuit LR is for example (but not limited) implemented and arranged as a single circle/circular wire without cross-connection portion(s) if the number of turns N2 is configured as one, and single circle wire can be regarded as an outer ring of the inductor circuit 120 and is disposed on a specific ring the specific plane to form a ring/circle shape as shown in FIG. 2. The center terminal/node LR_C of the single wire is coupled to the ground node P4 of the receiver circuit 110, and the first end LR_E1 and second end LR_E2 of receiver inductive circuit LR are respectively coupled to the input ports R1 and R2 of the receiver circuit 110. Further, the center terminal/node LR_C of the single circular wire may be coupled to other different circuits which are located at different angles/positions on the specific plane.

In FIG. 3, the antenna inductive circuit LA is for example implemented and arranged as two circles, i.e. an inner circle (or inner antenna wire) 301 and an outer circle (or outer antenna wire) 302 with one cross-connection portion 303 wherein each circle 301 and 302 is associated with one circular wire if the number of turns N1 is configured as two. The inner circle 301 and outer circle 302 both are to be configured and located inside the outer ring of the inductor circuit 120, i.e. surrounded by the receiver inductive circuit LR. The antenna inductive circuit LA equivalently is arranged as a spiral shape.

In FIG. 4, the transmitter inductive circuit LT is for example implemented and arranged as three circles, i.e. an inner circle 401, an intermediate circle 402, and an outer circle 403 with multiple cross-connection portions 404 such as five cross-section portions, wherein each circle is associated with two circular wires (i.e. an inner wire and an outer wire) if the number of turns N3 and the number of turns N4 is configured as six and four respectively. The distance between two different adjacent circles is larger than the distance between two adjacent circular wires belonging to the same circle, as shown in FIG. 4. That is, each inner/intermediate/outer circle 401-403 of the transmitter inductive circuit LT includes two wires, so that the total length from the first end LT_E1 of transmitter inductive circuit LT to the second end LT_E2 of transmitter inductive circuit LT is configured to have six circular wires, and comparatively the total length from the first end LA_E1 of antenna inductive circuit LA to the second end LA_E2 of antenna inductive circuit LA is configured to have two circular wires. This achieves that the turns ratio N1:N3 of the transformer (i.e. the inductor circuit 120) is equal to 2:6. Similarly, the total length from the first intermediate terminal LT_E3 of transmitter inductive circuit LT to the second intermediate terminal LT_E4 of transmitter inductive circuit LT is configured to have four circular wires, and this achieves that the turns ratio N1:N4 of the transformer (i.e. the inductor circuit 120) is equal to 2:4. Similarly, the inner circle 401, intermediate circle 402, and outer circle 403 all are to be configured and located inside the outer ring of the inductor circuit 120, i.e. surrounded by the receiver inductive circuit LR. The transmitter inductive circuit LT equivalently is arranged as a spiral shape.

In FIG. 5, the inner circle 301 of the antenna inductive circuit LA is disposed between the inner circle 401 and intermediate circle 402 of the transmitter inductive circuit LT so as to separate the inner circle 401 and intermediate circle 402 of the transmitter inductive circuit LT. In addition, the outer circle 302 of the antenna inductive circuit LA is disposed between the outer circle 403 and intermediate circle 402 of the transmitter inductive circuit LT so as to separate the outer circle 403 and intermediate circle 402 of the transmitter inductive circuit LT. It is easy to implement the circuit displacement/arrangement of FIG. 5 on the single circuit die. The transmitter inductive circuit's LT inner circle 401 is equivalently surrounded by the antenna inductive circuit's LA inner circle 301 which is equivalently surrounded by the transmitter inductive circuit's LT intermediate circle 402 which is equivalently surrounded by the antenna inductive circuit's LA outer circle 302 which is equivalently surrounded by the transmitter inductive circuit's LT outer circle 403 which is equivalently surrounded by the receiver inductive circuit's LR circle wire. As shown in FIG. 5, the transmitter inductive circuit LT and the antenna inductive circuit LA can be regarded to be disposed on an inner ring shape area of the specific plane, which is surrounded by the outer ring of the inductor circuit 120. In addition, the circuit area, occupied by the transmitter inductive circuit LT, on the specific plane is larger than a circuit area occupied by the receiver inductive circuit LR and by the antenna inductive circuit LA.

Further, in FIG. 5, the antenna inductive circuit LA comprises two antenna circles/wires, and the transmitter inductive circuit LT comprises three transmitter rings/circles each comprising two circular wires; each antenna circle/wire is disposed between two transmitter rings/circles. In other embodiments, the antenna inductive circuit LA may comprise N antenna circles/wires, and the transmitter inductive circuit LT may comprise (N+1) transmitter rings/circles each comprising M circular wires. The value N can be equal to or larger than three so as to achieve the different designs of different turns ratios N1:N2, N1:N3, and N1:N4. The value M can be different from two. These modifications also fall within the scope of the invention.

In other embodiment, different inner/intermediate/outer circles 401-403 of the transmitter inductive circuit LT may respectively have different numbers of circular wires in response to the different designs of the ratios N1:N2, N1:N3, and N1:N4. Further, it should be noted that the shape of the above-mentioned at least one ring/circle/wire can be octagon/polygon/circular. The shape is not intended to be a limitation of the invention.

Further, in FIG. 5, the first end LR_E1 and the second end LR_E2 of the receiver inductive circuit LR and the ends LT_E1, LT_E2, LT_E3, and LT_E4 of the transmitter inductive circuit LT can be configured and are located as a first side of a single chip die of the inductor circuit 120, i.e. the bottom side in FIG. 5. The first end LA_E1 and the second end LA_E2 of the antenna inductive circuit LA is located at a second side (i.e. the top side) of the inductor circuit 120, which is different from the bottom side. In other embodiments, all the ends of the three inductive circuits LA, LT, and LR can be disposed at the same side of the single chip die or can be disposed at different sides of the single chip die, e.g. the left or right side of the single chip die.

By integrating the transformer, balun circuit, and inductive components, the provided technical solution can provide better circuit balancing and better circuit/signal matching and can save more circuit areas. In addition, the wires of the inductive circuits at the primary side and secondary side of the transformer 120 in FIG. 1 and FIG. 5 can be implemented on the same metal layer and can be implemented by using a top layer such as a thick metal layer (but not limited) to decrease possible loss and obtain a better quality factor. Further, the transformer 120 as shown in FIG. 1 and FIG. 5 can be suitable for and applied into a variety of applications, and for example it can be applied into a structure of a multi-power selection power amplifier at the transmitter circuit 115, a structure of the Doherty power amplifier, a structure of a Gm-boosted CG low noise amplifier at the receiver circuit 110, a structure of source inductive-degenerated low noise amplifier, and so on.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An inductor circuit, comprising:
a receiver inductive circuit, having a first end coupled to a first input port of a receiver circuit and a second end coupled to a second input port of the receiver circuit;
a transmitter inductive circuit, having a first end coupled to a first output port of a transmitter circuit and a second end coupled to a second output port of the transmitter circuit; and
an antenna inductive circuit, having a first end coupled to a first signal port of an antenna circuit and a second end coupled to a second signal port of the antenna circuit;
wherein the receiver inductive circuit is disposed on a specific ring of a specific plane to form a ring shape; the transmitter inductive circuit and the antenna inductive circuit are disposed inside the specific ring and surrounded by the specific ring of the specific plane; and, a circuit area, occupied by the transmitter inductive circuit, inside the specific ring and on the specific plane, is larger than a circuit area occupied by the receiver inductive circuit and by the antenna inductive circuit.

2. The inductor circuit of claim 1, wherein the transmitter inductive circuit further comprises a first intermediate terminal coupled to a third output port of the transmitter circuit and a second intermediate terminal coupled to a fourth output port of the transmitter circuit; and, the first output port and the second output port of the transmitter circuit correspond to a first transmission power, and the third output port and the fourth output port of the transmitter circuit correspond to a second transmission power which is different from the first transmission power.

3. The inductor circuit of claim 1, wherein the receiver inductive circuit, the transmitter inductive circuit, and the antenna inductive circuit are disposed within a single chip die.

4. The inductor circuit of claim 1, wherein the antenna inductive circuit comprises an inner antenna wire and an outer antenna wire; the transmitter inductive circuit comprises an inner circle, an intermediate circle, and an outer circle; the inner antenna wire is disposed between the inner circle and the intermediate circle of the transmitter inductive circuit; the outer antenna wire is disposed between the intermediate circle and the outer circle of the transmitter inductive circuit; and, the outer circle of the transmitter inductive circuit is disposed between the outer antenna wire and the receiver inductive circuit which is disposed on the specific ring of the specific plane.

5. The inductor circuit of claim 4, wherein each of the inner circle, the intermediate circle, and the outer circle of the transmitter inductive circuit has an inner wire and an outer wire to form a spiral shape for the transmitter inductive circuit.

6. The inductor circuit of claim 4, wherein the antenna inductive circuit comprises N antenna wires; the transmitter inductive circuit comprises (N+1) circles; and, each antenna wire is disposed between two circles of the transmitter inductive circuit, and N is equal to or larger than three.

7. The inductor circuit of claim 1, wherein the first end and the second end of the receiver inductive circuit and the first end and the second end of the transmitter inductive circuit are located as a first side of the inductor circuit, and the first end and the second end of the antenna inductive circuit is located at a second side of the inductor circuit, which is different from the first side of the inductor circuit.

8. A wireless communication device, comprising:
   an antenna circuit;
   a receiver circuit;
   a transmitter circuit; and
   an inductor circuit, comprising:
      a receiver inductive circuit, having a first end coupled to a first input port of the receiver circuit 110 and a second end coupled to a second input port of the receiver circuit;
      a transmitter inductive circuit, having a first end coupled to a first output port of the transmitter circuit and a second end coupled to a second output port of the transmitter circuit; and
      an antenna inductive circuit, having a first end coupled to a first signal port of the antenna circuit and a second end coupled to a second signal port of the antenna circuit;

wherein the receiver inductive circuit is disposed on a specific ring of a specific plane to form a ring shape; the transmitter inductive circuit and the antenna inductive circuit are disposed inside the specific ring and surrounded by the specific ring of the specific plane; and, a circuit area, occupied by the transmitter inductive circuit, inside the specific ring and on the specific plane, is larger than a circuit area occupied by the receiver inductive circuit and by the antenna inductive circuit.

9. The wireless communication device of claim 8, wherein the transmitter inductive circuit further comprises a first intermediate terminal coupled to a third output port of the transmitter circuit and a second intermediate terminal coupled to a fourth output port of the transmitter circuit; and, the first output port and the second output port of the transmitter circuit correspond to a first transmission power, and the third output port and the fourth output port of the transmitter circuit correspond to a second transmission power which is different from the first transmission power.

10. The wireless communication device of claim 8, wherein the receiver inductive circuit, the transmitter inductive circuit, and the antenna inductive circuit are disposed within a single chip die.

11. The wireless communication device of claim 8, wherein the antenna inductive circuit comprises an inner antenna wire and an outer antenna wire; the transmitter inductive circuit comprises an inner circle, an intermediate circle, and an outer circle; the inner antenna wire is disposed between the inner circle and the intermediate circle of the transmitter inductive circuit; the outer antenna wire is disposed between the intermediate circle and the outer circle of the transmitter inductive circuit; and, the outer circle of the transmitter inductive circuit is disposed between the outer antenna wire and the receiver inductive circuit which is disposed on the specific ring of the specific plane.

12. The wireless communication device of claim 11, wherein each of the inner circle, the intermediate circle, and the outer circle of the transmitter inductive circuit has an inner wire and an outer wire to form a spiral shape for the transmitter inductive circuit.

13. The wireless communication device of claim 11, wherein the antenna inductive circuit comprises N antenna wires; the transmitter inductive circuit comprises (N+1) circles; and, each antenna wire is disposed between two circles of the transmitter inductive circuit, and N is equal to or larger than three.

14. The wireless communication device of claim 8, wherein the first end and the second end of the receiver inductive circuit and the first end and the second end of the transmitter inductive circuit are located as a first side of the inductor circuit, and the first end and the second end of the antenna inductive circuit is located at a second side of the inductor circuit, which is different from the first side of the inductor circuit.

* * * * *